(12) United States Patent
Havel

(10) Patent No.: US 11,279,201 B2
(45) Date of Patent: Mar. 22, 2022

(54) AIR COOLING OF THE ELECTRONICS OF A BLDC MOTOR

(71) Applicant: Hanon Systems Bad Homburg GmbH, Bad Homburg V. D. Höhe (DE)

(72) Inventor: Brian Havel, Waldaschaff (DE)

(73) Assignee: Hanon Systems Bad Homburg GmbH, Bad Homburg V. D. Höhe (DE)

( * ) Notice: Subject to any disclaimer, the term of this patent is extended or adjusted under 35 U.S.C. 154(b) by 40 days.

(21) Appl. No.: 16/672,829

(22) Filed: Nov. 4, 2019

(65) Prior Publication Data

US 2020/0139785 A1    May 7, 2020

(30) Foreign Application Priority Data

Nov. 7, 2018 (DE) .......................... 102018218988.9

(51) Int. Cl.
| | |
|---|---|
| F25D 23/12 | (2006.01) |
| B60H 1/00 | (2006.01) |
| H02K 9/06 | (2006.01) |
| F28D 7/10 | (2006.01) |
| F28D 21/00 | (2006.01) |

(52) U.S. Cl.
CPC ........... *B60H 1/00464* (2013.01); *F28D 7/10* (2013.01); *H02K 9/06* (2013.01); *B60H 2001/00614* (2013.01); *F28D 2021/0029* (2013.01)

(58) Field of Classification Search
CPC ...... B60H 1/00464; B60H 2001/00614; F28D 7/10; F28D 2021/0029; H02K 9/06
USPC ....................................................... 62/259.2
See application file for complete search history.

(56) References Cited

U.S. PATENT DOCUMENTS

| | | | |
|---|---|---|---|
| 634,494 A | 10/1899 | Brinser | |
| 3,196,940 A * | 7/1965 | Saslow | ............... F04D 25/0613 |
| | | | 165/108 |
| 6,384,494 B1 | 5/2002 | Avidano et al. | |
| 2005/0116554 A1 | 6/2005 | Dano et al. | |

(Continued)

FOREIGN PATENT DOCUMENTS

| | | |
|---|---|---|
| JP | 2009142123 A | 6/2009 |
| KR | 20080036003 A | 4/2008 |
| KR | 20130059588 A | 6/2013 |

OTHER PUBLICATIONS

First Office Action regarding Korean Patent Application No. 10-2019-0142072 dated Jul. 8, 2020.

*Primary Examiner* — Davis D Hwu
(74) *Attorney, Agent, or Firm* — Harness, Dickey & Pierce, P.L.C.

(57) ABSTRACT

A fan unit for a cooling system in an automobile, comprises an electric motor comprising a rotor and a stator, wherein the stator is formed in the centre of the electric motor and the rotor is arranged radially outwards around the stator, a heat sink adjacent to the stator shaft comprising electronic components comprising heat fins fixed to the circumference of the heat sink and a fan hub, fixedly connected to the rotor of the electric motor and located radially outwards of the rotor, the fan hub extends in the direction of the heat sink and comprises fan blades to generate an air flow, wherein the fan hub further comprises a radial impeller that is located adjacent to the heat fins of the impeller.

6 Claims, 2 Drawing Sheets

(56) References Cited

U.S. PATENT DOCUMENTS

2010/0175377 A1\* 7/2010 Hippen .................. F02B 39/10
                                                        60/602
2019/0285076 A1\* 9/2019 Okuda .................. F04D 25/082

\* cited by examiner

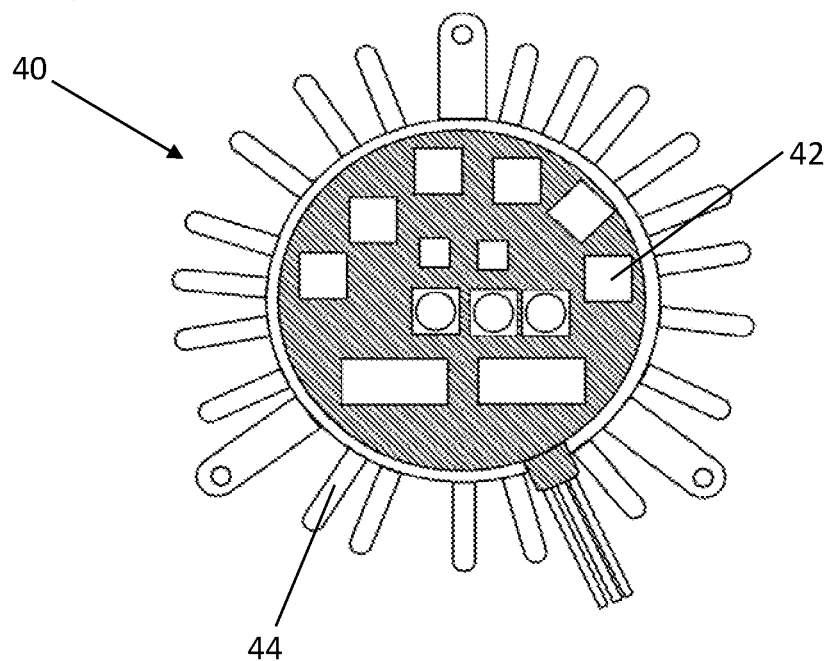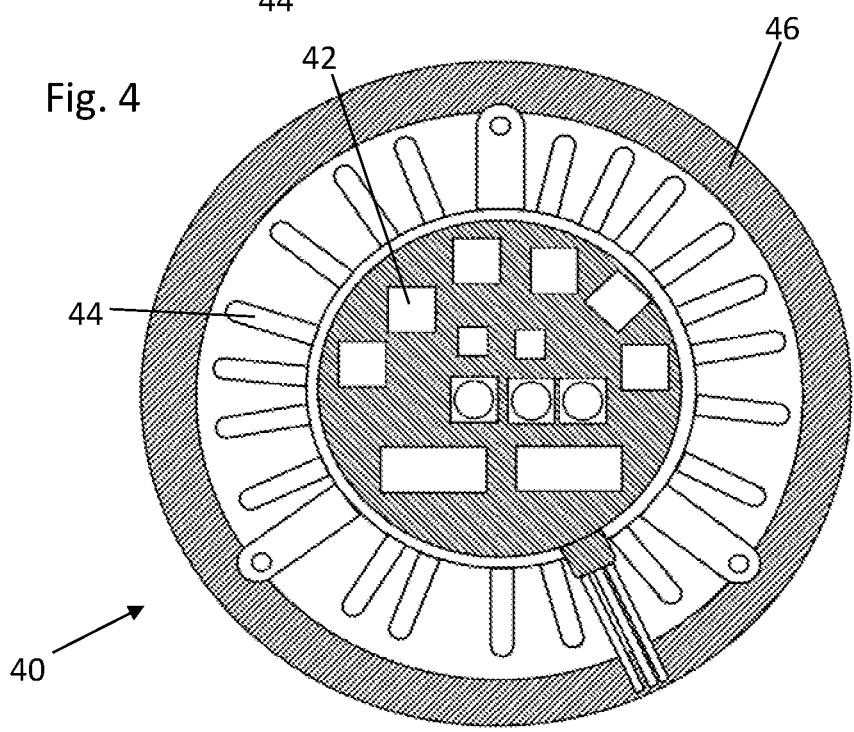

AIR COOLING OF THE ELECTRONICS OF A BLDC MOTOR

CROSS-REFERENCE TO RELATED APPLICATIONS

This application claims the benefit of German Patent Application No. 102018218988.9, filed on Nov. 7, 2018. The entire disclosure of the application referenced above is incorporated herein by reference.

FIELD

The invention relates to a fan unit for cooling a cooling system in an automobile.

BACKGROUND

Generally, fans for cooling a cooling system in an automobile like an Engine is driven by a brushless electric motor. The brushless electric motor is commutated using an integrated power electronics unit that produces heat. This heat needs to be removed from the brushless electric motor since otherwise the electronic components can be damaged due to excessive heat. The ambient temperature in the engine compartment is very high up to 120° C. However, the electronics should be kept under 150°. Since the electronics must also be sealed to prevent water exposure and they are in a very tight space due to the engine constraints, effective cooling of the electronics must be ensured.

The cooling of electronics can be achieved in many ways. One of the simples and most effective ways is to place the electronics control unit (ECU) externally in a box which is exposed to high velocity main stream air produced by the fan. However, the high electromagnetic emission of such systems are added complexity and cost and also the influence on airflow efficiency and acoustics of the fan system are negative. Furthermore, if the ECU is located apart from the fan, the fan unit is built less compact and mounting the fan unit is more complicated.

However, with integrated electronics units where the motor and the ECU are built in the same housing the cooling becomes more challenging. Existing designs incorporate a large number of pins or fins integrated into the shape of the electronics housing. With this design the heat transfer surface is increased within a given volume available. The mechanism of heat transfer is mainly by natural convection, which is the energy transfer from a surface due to the local heating up of the surrounding fluid which is slowly set into motion as it heats up. Since these fins usually are located in a place with little air flow, the heat transfer is highly limited, and the ECU housing must have a very large of surface area.

Further solution is the use of heat fins that protrude radially from the motor into air that is generated by the main engine cooling fan. The disadvantage is very bulky design that often does not fit into most applications that require compact solutions Also this design is heavy.

U.S. Pat. No. 6,384,494, for instance, discloses a motor-driven fan that includes an electric motor including a rotor and a stator in which the rotor includes an essentially cup-shaped cap which extends at least partly around the stator and has a plurality of lateral exit openings adjacent the bottom wall, and an impeller or fan including a hollow hub from which extends a plurality of main outer fan blades. This hub has a front wall fixed to the back wall of the cap of the rotor and a lateral skirt which surrounds the lateral wall of the cap in a radially spaced relationship.

SUMMARY

The object of the invention is to improve the cooling of the electric components of the control system without increasing the required space greatly.

The object is achieved by a fan unit according to claim 1. Further preferred embodiments are depicted in the dependent claims.

An inventive fan unit for a cooling system in an automobile according to the invention, comprises an electric motor comprising a rotor portion and a stator portion, wherein the stator portion is formed as a shaft and the rotor portion is arranged radially outwards around the stator, a heat sink adjacent to the stator shaft comprising electronic components in particular for controlling the electric motor and comprising heat fins fixed to the circumference of the heat sink and a fan unit hub, fixedly connected to the rotor portion of the motor and located radially outwards of the rotor portion, the fan unit hub extends in the direction of the heat sink and comprises fan blades to generate an air flow, wherein the fan unit hub further comprises a radial impeller that is located adjacent to the heat fins of the impeller. The impeller adjacent to the heat fins enhances the air flow at the heat fins of the ECU by pushing the air radially outwards, thereby sucking the air out of the heat fins and generating proper air movement right at the heat sink.

The fan unit can further comprise a motor mounting ring that encloses the heat sink. By providing a wall on the circumference of the heat fins, the mounting ring enables the space between the heat fins to act as fluid tunnels for the flow of the air sucked out from the heat fins by the impeller.

Preferably, the radial impeller is extending over the motor mounting ring so as to ensure that the suction flow from the heat fins into the impeller is properly applied over the whole diameter of the suction fins.

The maximum distance between the radial impeller and the heat sink is 10 mm, more preferably 5 mm, most preferably 2 mm or less. The distance is optimal for the suction from the impeller acting on the heat fins. However, it is also preferred, that it is not closer than 1 mm to avoid contact of the rotating impeller and the stationary heat fins.

The radial impeller is preferably fixed on the side of the fan unit hub directed to the heat sink.

The fan unit comprises a brushless motor as the electric motor.

Preferably, the number of heat fins in the region with greater heat production of the heat sink is higher than on other regions of the heat sink. In this way, the heat transfer away from the heat producing elements can be improved.

BRIEF DESCRIPTION OF THE FIGURES

FIG. 3 shows a cross section through the heat sink seen from below; and

FIG. 4 shows the cross section from FIG. 3 including the motor mounting ring.

DETAILED DESCRIPTION

In the following, the terms "axial", "radial" and "circumferential" are used. "Axial" refers to a direction along the axis A in FIG. 1, "radial" to a direction perpendicular to the axis A and "circumferential" to a direction around the axis A (e.g. in FIGS. 3 and 4 around the heat sink). Furthermore, the terms "up" and "down" and all related terms like "above", "below", "top" and "bottom" or others are used with regard to FIGS. 1 and 2 if not defined otherwise.

Figure 1:
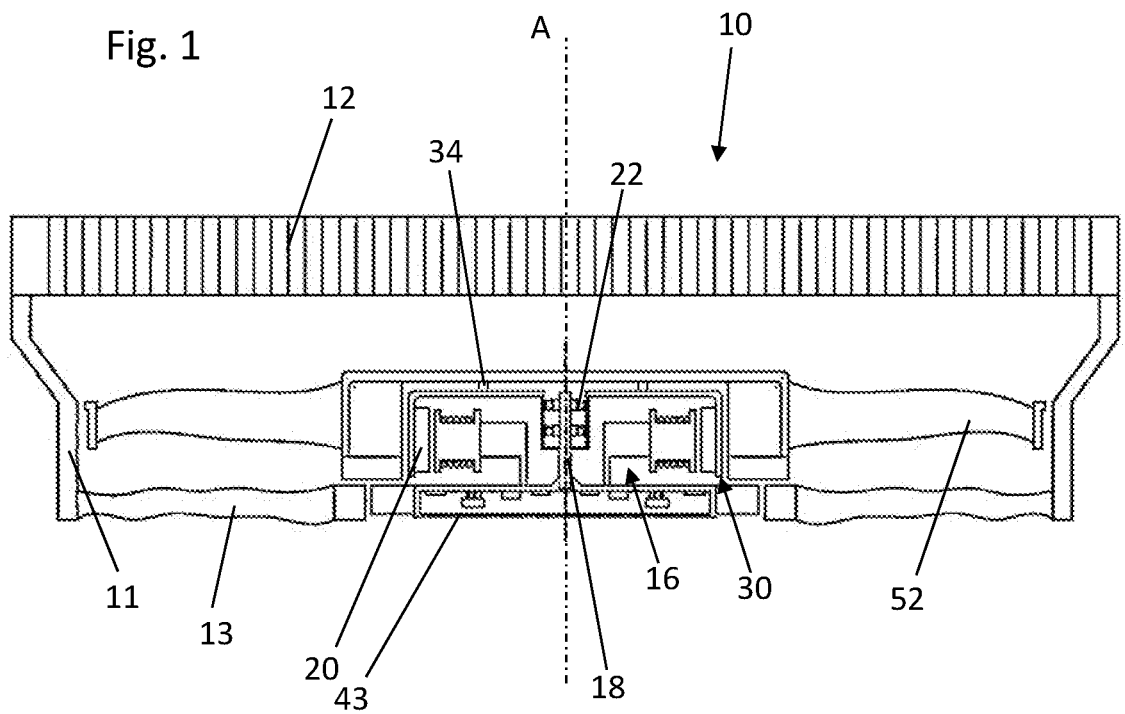
FIG. 1 shows a schematic axial section through a fan unit according to the invention.

FIG. 1 shows a longitudinal section of the fan unit 10 along the axis A. The fan unit 10 generally comprises a mesh 12, an electric motor 14 having a stator 16 and a rotor 18, a heat sink 40 including the electric components 42 for controlling the electric motor 14.

Figure 2:
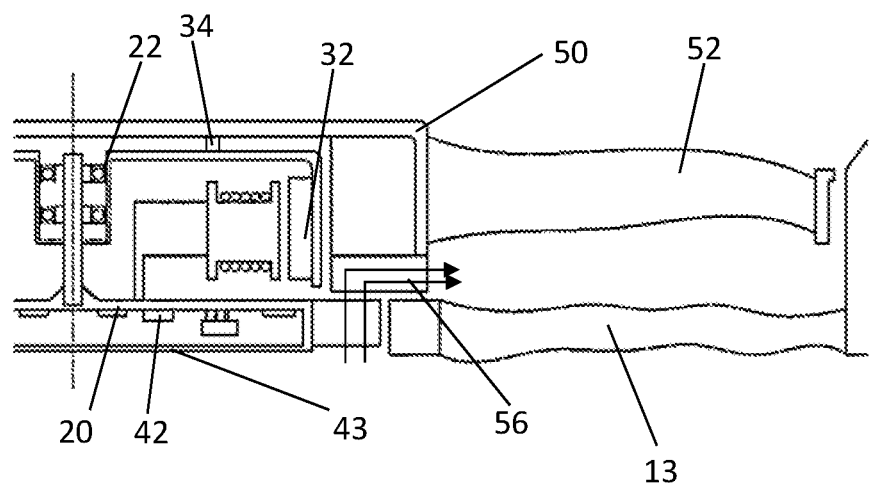
FIG. 2 shows an enlarged portion of FIG. 1.

The electric motor 12 comprises a stator 16 and a rotor 18. The stator 16 is provided at the inner portion of the electric motor 14 and comprises a shaft 18 and coils 20. The rotor 30 is supported with bearings 22 on the stator 16, in particular on its upper end, and is provided around the stator 16. In the brushless motor as shown in FIGS. 1 and 2, the rotor 30 comprises the permanent magnets 32.

The fan hub 50 is fixed on the rotor so as to be able to be rotated. The fan hub 50 can be welded onto the rotor 30 but can also be fixed with screws or bolts to the rotor 30. In FIGS. 1 and 2, the fixing means 34 are depicted merely schematically. The fan hub extends down in the direction of the heat sink 40 comprises a plurality of fan blades 52 which are fixed on the fan hub's circumference. The fan blades 52 generate the air flow for the element that is to be cooled by the fan unit 10.

The electric motor 12 is mounted on a heat sink 40 which accommodates the electrical components 42 for controlling the electric motor 12. The heat sink is shown in FIGS. 3 and 4 in a cross section and is usually made of a metal like aluminium or steel to improve heat transfer. The heat sink 40 of the present invention is hollow and open on the bottom side. A lid 43 is fixed to the heat sink 40 to close the opening. Fixing the lid 43 onto the heat sink 40 can be done by gluing, screwing, bolting or other fixing methods. On the circumference of the heat sink 40 are provided heat fins 44 which serve to increase the surface of the heat sink for enhancing the heat transfer to the surroundings. The heat fins 44 can have different lengths and can be placed in non-regular intervals from each other over the circumference of the heat sink 40. The single fins 44 can be 2 mm thick or less and have are spaced apart by at least 2 mm, more preferably 5 mm or more. The number of heat fins 44 are higher in a region of the circumference where the heat is generated, i.e. where more electric components are present. In FIGS. 3 and 4 for instance, there are more heat fins 44 in the upper right portion where also a majority of the electric components are located.

As can be seen in FIG. 4, a motor mounting ring 46 is preferably arranged around the heat sink in a predetermined distance to the tip of the longest fins. The predetermined distance is maximal 10 mm, more preferred 5 mm or 2 mm. The motor mounting ring is then fixed with one or more struts 13 on a housing 11 or a frame 11 that holds the fan unit in place. The mounting ring generates a guiding channel for the air flow generated by a below mentioned impeller 56.

The impeller 56 is arranged at the bottom of the fan hub 50 facing the heat fins 44. The impeller is fixed on the fan hub (e.g. by gluing, welding, screwing, etc) and is provided adjacent to the heat fins 44. The distance between the upper end of the heat fins and the should be 10 mm or less, preferably 5 mm or 2 mm or less. The impeller comprises inclined blades or walls that upon rotation of the fan hub (and the resulting rotation of the impeller) forces the air to flow radially outwards from the impeller thereby sucking the air from the heat fins. The impeller extends preferably over the motor mounting ring 46 in a radial direction. However, the opening through which the air is sucked from the heat fins into the impeller can be limited to the portion that is directly opposite the heat fins.

When the fan unit 10 is activated, electric motor 12 is started and the coils 20 are supplied with electric current. In return, the rotor 30 starts rotating together with the fan hub 50 which is fixed to the rotor 30. The fan blades 52 are generating the air flow for the cooling and the impeller 56 is rotating with the fan hub. The heat that is generated by the electric components 42 is transferred into the heat sink 40 including the heat fins 44 and into the immediate environment. Since the impeller 56 is rotating with the fan hub 50, the impeller 56 also generates an air flow which is indicated by the arrows in FIG. 2 thereby greatly increasing the air flow between the heat fins and, thus, the heat transfer to the air. In this way, the cooling of the heat sink is majorly improved.

What is claimed:

1. A fan unit for a cooling system in an automobile, comprising:
   an electric motor comprising a rotor and a stator, wherein the stator is formed in the centre of the electric motor and the rotor is arranged radially outwards around the stator;
   a heat sink adjacent to stator shaft comprising electronic components comprising heat fins fixed to the circumference of the heat sink; and
   a fan hub, fixedly connected to the rotor of the electric motor and located radially outwards of the rotor, the fan hub extends in the direction of the heat sink and comprises fan blades to generate an air flow;
   wherein the fan hub further comprises a radial impeller that is fixed on the side of the fan hub directed to the heat sink, the radial impeller being positioned in direct fluid communication with and located adjacent to the heat fins of the heat sink, and
   the radial impeller drawing air across the heat fins and providing the air directly to the fan blades, wherein the radial impeller includes impeller blades that are axially aligned with the heat fins of the heat sink.

2. The fan unit according to claim 1, further comprising a motor mounting ring that encloses the heat sink.

3. The fan unit according to claim 1, wherein the radial impeller is extending over the motor mounting ring.

4. The fan unit according to claim 1, wherein the maximum distance between the radial impeller and the heat sink is 10 mm.

5. The fan unit according to claim 1, wherein the electric motor is a brushless motor.

6. The fan unit according to claim 1, wherein the number of heat fins in the region with greater heat production of the heat sink is higher than on other regions of the heat sink.

* * * * *